United States Patent [19] [11] 4,021,590
Vangbo [45] May 3, 1977

[54] METHOD OF MANUFACTURING A CONTACT BODY

[75] Inventor: Hakan Vangbo, Jarfalla, Sweden

[73] Assignee: Aktiebolaget Carl Munters, Sollentuna, Sweden

[22] Filed: Apr. 1, 1975

[21] Appl. No.: 564,115

[30] Foreign Application Priority Data

Apr. 9, 1974 Sweden .......................... 74048174

[52] U.S. Cl. ................................. 428/186; 156/210; 427/344; 427/352; 427/376 A

[51] Int. Cl.² ..................... B32B 3/28; B32B 19/08; B05D 3/04; B05D 3/02

[58] Field of Search ................. 428/271, 443, 186; 427/376, 372, 403, 333, 344, 352; 156/210

[56] References Cited

UNITED STATES PATENTS

| | | | |
|---|---|---|---|
| 1,972,500 | 9/1934 | Taohey et al. ................. | 428/186 X |
| 2,354,350 | 7/1944 | Schuetz ............................ | 428/443 |
| 2,354,351 | 7/1944 | Schuetz ........................... | 427/403 X |
| 2,434,466 | 1/1948 | Marc .................................. | 428/443 |
| 3,499,812 | 3/1970 | Glav ................................. | 428/443 X |

FOREIGN PATENTS OR APPLICATIONS

| | | | |
|---|---|---|---|
| 998,132 | 7/1965 | United Kingdom ............... | 428/186 |
| 1,040,061 | 8/1966 | United Kingdom ............... | 428/186 |
| 1,140,042 | 1/1969 | United Kingdom ............... | 428/186 |

*Primary Examiner*—James R. Hoffman
*Attorney, Agent, or Firm*—John A. Mitchell; Pasquale A. Razzano

[57] ABSTRACT

A method of manufacturing a contact body is disclosed wherein layers of asbestos are formed and arranged so that the individual layers bear against one another at mutually spaced positions to provide a plurality of channels extending through the body from one end to the other with the layers being heated together with at least one substance containing silicon and aluminum to sintering temperature. The addition of silicon and alumina to the contact body is adjusted so that in the sintered layers the ratio, by weight, of the oxide of silicon to the oxides of aluminum and magnesium is in the range of 45–55% $SiO_2$, 30–45% $Al_2O_3$ and 10–20% $MgO$.

11 Claims, No Drawings

METHOD OF MANUFACTURING A CONTACT BODY

The present invention relates to a method of manufacturing a contact body in which layers of asbestos are so arranged that the layers bear against one another at mutually spaced positions so as to form a plurality of channels extending from end to end.

The spacing of the layers of the contact body may be effected in any known manner for example alternate layers may be wholly or partially corrugated or formed with longitudinal protruberances which bear against interposed even layers.

A contact body of the kind defined in the above introduction is known from e.g. the British Patent Specification No. 1,140,042. As is evident from this patent specification the body may be built up of alternate plane and corrugated layers of asbestos paper of a commercially available kind. In this connection, there is initially formed a web composed of two layers or strips of asbestos paper of which one is formed with folds or corrugations with the folds running parallel to one another and the other is plane. The two layers are glued together at the fold ridges e.g. with water-glass to form a single-waved structure, from which a contact body blank of desired size is built up for example by coiling the composite web formed into cylindrical shape. The cylindrical shape is especially suited, if the contact body is to be placed into a cylindrical passage e.g. the exhaust gas pipe from an internal combustion motor or be used as rotor in an exchanger apparatus. The body may be manufactured in other ways, e.g. by sawing out sectors or segments to intended, such as cylindrical, form from a block or packet of the layers. The height of the corrugations or folds which determines the spacing between the even or plane layers is preferably less than 3 mms such as about 1.5 mm. The average spacing between the layers must thus be less than 1.5 mm. Once so formed the body is heated to sintering temperature together with one or several substances containing silicon and aluminium.

A contact body of this kind is primarily intended for action on gases at high temperatures or is subjected to large variations in temperature as is the case in heat exhangers for utilizing the heat content of the exhaust gases in gas turbines or when the contact body constitutes a carrier for catalysts.

An object of the invention is to provide a contact body which withstands very high temperatures and which in addition withstands large variations in temperature by having a low heat expansion coefficient.

According to the present invention a method of manufacturing a contact body comprises the steps of, forming layers of asbestos arranged so that the layers bear against one another at mutually spaced positions to provide a plurality of channels in the body extending from end to end and heating the body together with at least one substance containing silicon and aluminium to sintering temperature, the addition of the silicon and aluminium being adjusted so that in the sintered layers the ratio by weight of the oxide of silicon to the oxides of aluminium and magenesium is in the range of 45 – 55% $SiO_2$, 30 – 45% $Al_2O_3$ and 10 – 20% MgO.

Preferred values for the three components are 47 – 52% $SiO_2$, 32 – 40% $Al_2O_3$ and 12 – 18% MgO.

By forming a contact body in this way it has a low heat expansion coefficient so that the body neither warps nor is impaired in any other way even if it is subjected to large temperature changes such as from room temperature up to 800° C in a short time.

In one embodiment of the invention the contact body blank built up from asbestos layers initially can be immersed into a water-glass solution having a composition from $Na_2O \cdot 1.6 SiO_2$ to $Na_2O.4SiO_2$. The solution to be most suitable should have a dry substance content of 20–40%, preferably 25–30%. As an alternative, it may be based on a potassium silicate solution of corresponding composition. After that, the excess water-glass is blown out from the channels of the body and the body then immersed into a liquid having a great affinity to water such as concentrated alcohol solution, whereby the remaining water-glass is transferred into a kind of gel form, the body at the same time obtaining increased strength. The contact body is now immersed into a liquid or a gas is passed through the body in order to precipitate $SiO_2$ from the water-glass. The liquid may be constituted by an acid, such as hydrochloric acid, nitric acid, sulphuric acid, phosphoric acid, acetic acid, citric acid, oxalic acid etc. further by ammonium salt solution, such as carbonate, bicarbonate, phosphate, sulphate, chloride, acetate of ammonium etc.

As an alternative, a gas such as $CO_2$ for example, may act as precipitating agent.

After rinsing and drying the contact body blank is subjected to renewed treatment with the two components as above, until the asbestos layers have received a predetermined quantity of $SiO_2$, which calculated on the quantity of asbestos fibres must be 100–130%.

subsequently, the contact body is immersed into a colloidal dispersion of aluminium oxide for supplying a predetermined quantity of $Al_2O_3$. The concentration and viscosity of the solution must be of an order so that it can penetrate into the pores between the fibrils or filament bundles of the asbestos fibres. Thereupon, the contact body is dried at 90°–175° C, and then a renewed immersion into a colloidal solution of $Al_2O_3$ is effected until the quantity of $Al_2O_3$ in the body blank amounts to 100–120% of the quantity of asbestos fibres.

The asbestos contains oxides of magnesium and silicon as essential components and in a quantity calculated as percentage which may vary according to the locality of origin. The quantity of each usually is kept within the limits of 37–44% but the asbestos type of particular interest for this application is chrysotile. After the content of MgO for a certain asbestos quality has been determined, the relation between the resident quantity of MgO and $SiO_2$ contained therein and the externally supplied components $SiO_2$ and $Al_2O_3$ by the impregnation steps described above, is adjusted preferably so that MgO is contained as 15%, $SiO_2$ as 50% and $Al_2O_3$ as 35%. These values may be varied by a few percents upwards or downwards but must, according to the invention, be kept within the limits stated above. However it is suitable to keep the quantity of $SiO_2$ within 47–52% and that of $Al_2O_3$ within 32–40%.

The contact body then is sintered at a temperature within the range of 1000°–1250° C to obtain a coherent body of the sintered layers which practically is unaffected by very large and sudden changes in temperature. It also has a high capacity of withstanding chemicals of different kinds.

Small quantities of additives can be used to render the sintering process easier. These agents e.g. Zn or Li, can be added in connection with the precipitation of the $SiO_2$.

In another embodiment of the invention, the Si-Al-components are admixed to the bulk of asbestos fibres from which the sheets or layers are produced. As examples of such additives in solution or suspension are:

| | |
|---|---|
| a) Kaolin | 150–250% of the asbestos quantity |
| b) $SiO_2 + Al_2O_3$ | 80–120 and 70–130%, respectively |
| c) $SiO_2 + AlO(OH)$ | 80–120 and 80–150% respectively |
| d) $SiO_2 + Al(OH)_3$ | 80–120 and 100–200% respectively |
| e) $Al_2O_3$ + pyrophyllite | 30–50 and 100–170% respectively |

The quantity of the added substance or substances is adjusted so that the proportions between the three main components becomes that stated above.

In the manufacture of asbestos paper normally a minor quantity of organic binding agents is added the purpose of which is to increase the mechanical strength of the finished paper. In practice, one adds for this purpose up to about 15 percents by weight of the organic substances. In this embodiment the produced asbestos paper will contain so much externally added components that the paper could not be handled even during those steps of treatment, e.g. corrugation of the layers, which are required for building up a blank of the contact body. Therefore to reduce the proportion of additives, calculated on the weight of the asbestos paper, preferably substantially more organic substances than normal are added in the form of fibres and binding agents to the asbestos fibre bulk. This addition which may amount to 50% or more, is burnt off during the sintering step and therefore is only for use during the shaping proper of the body of layers since paper with this greater proportion of organic material is easier to be shaped.

The asbestos paper manufactured in this manner, and which may have a thickness of 0.1–0.5 mm is folded or formed with protuberances in a wetted state. The wetting may be effected under simultaneous addition of solution of Na- or Ka-water-glass. This makes sure that the folded structure obtains a rigidity which additionally facilitates the building up of the contact body blank. Thereupon follows the heat treatment at 1000°–1250° C and the final product then obtains the same composition as stated above.

Minor additives for improving the sintering properties may be made in the form of, for example, ZnO, Zn-silicate, Li-silicate, $Cr_2O_3$, CaO, Ca-silicate etc. These additives must constitute only a few percents of the weight of the final product.

Due to their hardness and the capacity of retaining their shape contact bodies manufactured according to the invention may also find application in e.g. heat and/or moisture exchangers e.g. between two air streams where the temperature is more moderate. In a moisture exchanger or drier the exchanger body serves as a carrier for a hydroscopic substance, such as LiCl. The invention can also be used as packing in cooling towers or moisteners, in which water and air are brought to contact with one another. Examples of such exchangers can be found in the British Pat. Specification Nos. 1,073,315, 1,055,796 and 1,232,432.

Although the invention has been particularly described with reference to the specific embodiments described above variations of the disclosed methods may be made. For example one of the components e.g. the Al-compound, may be fed into the fibre bulk, of which the paper layers are manufactured while the second component, such as the silicon compound, may be supplied after the contact body has been formed. Alternatively, a portion of at least one component can be added to the fibre bulk, whereas the remainder is supplied to the shaped body.

What is claimed is:

1. A method of manufacturing a contact body comprising the steps of, forming layers of asbestos fibers arranged so that the layers bear against one another at mutually spaced positions to provide a plurality of channels in the body extending from end to end, adding to said asbestos fibers, either before or after said forming step, a predetermined quantity of a silicon compound and an aluminum compound thereafter heating the body together with said silicon and aluminum compounds to sintering temperature; said adding step including the step of adjusting the addition of the silicon and aluminum compounds so that in the sintered layers the ratio by weight of the oxide of silicon to the oxides of aluminum and magnesium is in the range of 45–55% $SiO_2$, 30–45% $Al_2O_3$ and 10–20% MgO.

2. A method according to claim 1 wherein the ratio is kept within the limits of 47–52% $SiO_2$, 32–40% $Al_2O_3$ and 12–18% MgO.

3. A method according to claim 1 wherein the layers in the contact body are impregnated at least twice with solutions or suspensions of substances containing a silicon compound and an aluminum compound.

4. A method according to claim 1 wherein said adding step is performed before said forming step and comprises the step of adding two separate substances to said asbestos respectively containing said silicon and aluminum compounds, said substances being admixed to the fibre bulk of which the asbestos layers are formed.

5. A contact body comprising layers of asbestos sintered together with a predetermined quantity of silicon and aluminum compounds and arranged so that the layers bear against one another at mutually spaced positions to provide a plurality of channels extending from end to end of the body, the sintered layers including between 45–55% $SiO_2$, 30–45% $Al_2O_3$ and 10–20% MgO by weight.

6. A method of manufacturing a contact body comprising the steps of, forming layers of asbestos arranged so that the layers bear against one another at mutually spaced positions to provide a plurality of channels in the body extending from end to end thereof; immersing the body in a solution containing a silicon compound; treating said body to precipitate $SiO_2$ thereon; thereafter immersing the body in a colloidal dispersion of aluminum oxide, and then sintering said body; said immersing steps being performed to adjust the ratio by weight of oxide of silicon to the oxides of aluminum and magnesium in the sintered layers to between 45–55% $SiO_2$, 30–45% $Al_2O_3$ and 10–20% MgO.

7. The method as defined in claim 6 wherein said step of immersing the body in a solution containing a silicon compound comprises the step of immersing the body in a solution selected from the group consisting of a water-glass solution having a composition of from $Na_2O.6SiO_2$ to $Na_2O.4SiO_2$ having a dry substance content of between 20 and 40%, or a potassium silicate solution of corresponding composition.

8. The method as defined in claim 7 including the step of immersing said body, after immersion in said solution containing a silicon compound, in a liquid having an affinity for water.

9. The method as defined in claim 7 wherein said step of treating the body to precipitate $SiO_2$ comprises the step of immersing the body in an acid and ammonium salt solution wherein the acid is selected from the group consisting of hydrochloric acid, nitric acid, sulphuric acid, phosphoric acid, acetic acid, citric acid, oxalic acid.

10. The method as defined in claim 7 wherein said step of treating the body to precipitate $SiO_2$ comprises the step of passing $CO_2$ gas through the body.

11. The method as defined in claim 7 wherein said sintering step comprises the step of sintering the body at a temperature range of 1000° to 1250° C.

* * * * *